March 3, 1953 — W. J. HUGHES — 2,630,132
PNEUMATIC SYSTEM FOR OPERATING FLOW CONTROL VALVES
Filed Sept. 29, 1950 — 3 Sheets-Sheet 1

INVENTOR.
Walter J. Hughes
BY
Agent.

March 3, 1953 W. J. HUGHES 2,630,132
PNEUMATIC SYSTEM FOR OPERATING FLOW CONTROL VALVES
Filed Sept. 29, 1950 3 Sheets-Sheet 2

INVENTOR.
Walter J. Hughes
BY J. Gurvz
Agent.

March 3, 1953 W. J. HUGHES 2,630,132
PNEUMATIC SYSTEM FOR OPERATING FLOW CONTROL VALVES
Filed Sept. 29, 1950 3 Sheets-Sheet 3

INVENTOR.
Walter J. Hughes
BY J. Gunz
Agent.

Patented Mar. 3, 1953

2,630,132

UNITED STATES PATENT OFFICE 2,630,132

PNEUMATIC SYSTEM FOR OPERATING FLOW CONTROL VALVES

Walter J. Hughes, Tucson, Ariz., assignor to Infilco Incorporated, Chicago, Ill., a corporation of Delaware Application September 29, 1950, Serial No. 187,591

4 Claims. (Cl. 137—486)

1

This invention relates to a system for operating a flow control valve, and more particularly to an air pressure operated system of this type.

It is an object of this invention to provide means for setting and maintaining of a flow rate from a point remote from the flow controller.

Another object of the invention is to provide a system for operating a flow control valve which is responsive to the balance or unbalance between a rating pressure of predetermined value and a controlled pressure whose value is responsive to the flow through the control valve.

Another object of the invention is to provide a flow control system wherein the character of the correcting movement positioning the main control valve is direct in action.

Another object of the invention is a system for operating a flow control valve that is free from hunting and overtravel and wherein an unbalance between the applied pressures is corrected by a minute rate correction.

Another object of the invention is to provide a control system for a flow control valve wherein a controlled air pressure derived from the actual flow through the valve is balanced against a predetermined rating air pressure.

Another object is to provide a control system of this general type which is equipped with means for individual control by application of a manually set rating pressure, and which is also adapted to be switched over to a rating pressure set up for common application to a group of individual controlled systems, such as from a master control.

Other objects of the invention will become apparent from the detailed description and the claims which follow.

The main parts of the system for operating the flow control valve which controls flow through a conduit are a pneumatically operated double-piston motor in driving connection with the valve, pressure fluid connections for operating the motor, and a pressure fluid escapement control, which regulates the operation of the motor from the balance between a set rating pressure and a controlled air pressure varying with the flow through the conduit and derived from a pneumatic rate of flow converter.

The invention is particularly suitable for use with a balanced iris type flow control valve, preferably of the type shown in my Patent Number 2,307,273, and will be described as applied to such a valve. However, it will be obvious to those skilled in the art, that the invention is not limited to use with any particular type of flow control valve.

2

The controlled air pressure which opposes the rating pressure in my system is preferably derived from a linear pneumatic converter, such as the converter of my Patent Number 2,520,547, which is shown herein for purposes of illustration and exemplification. However, other devices of this general type can be used. The invention is not limited to linear converters; non-linear devices may also be used with it and the square root extracted by separate means.

The invention will be more fully understood by reference to the drawings, which form a part hereof, and wherein.

Figure 1:
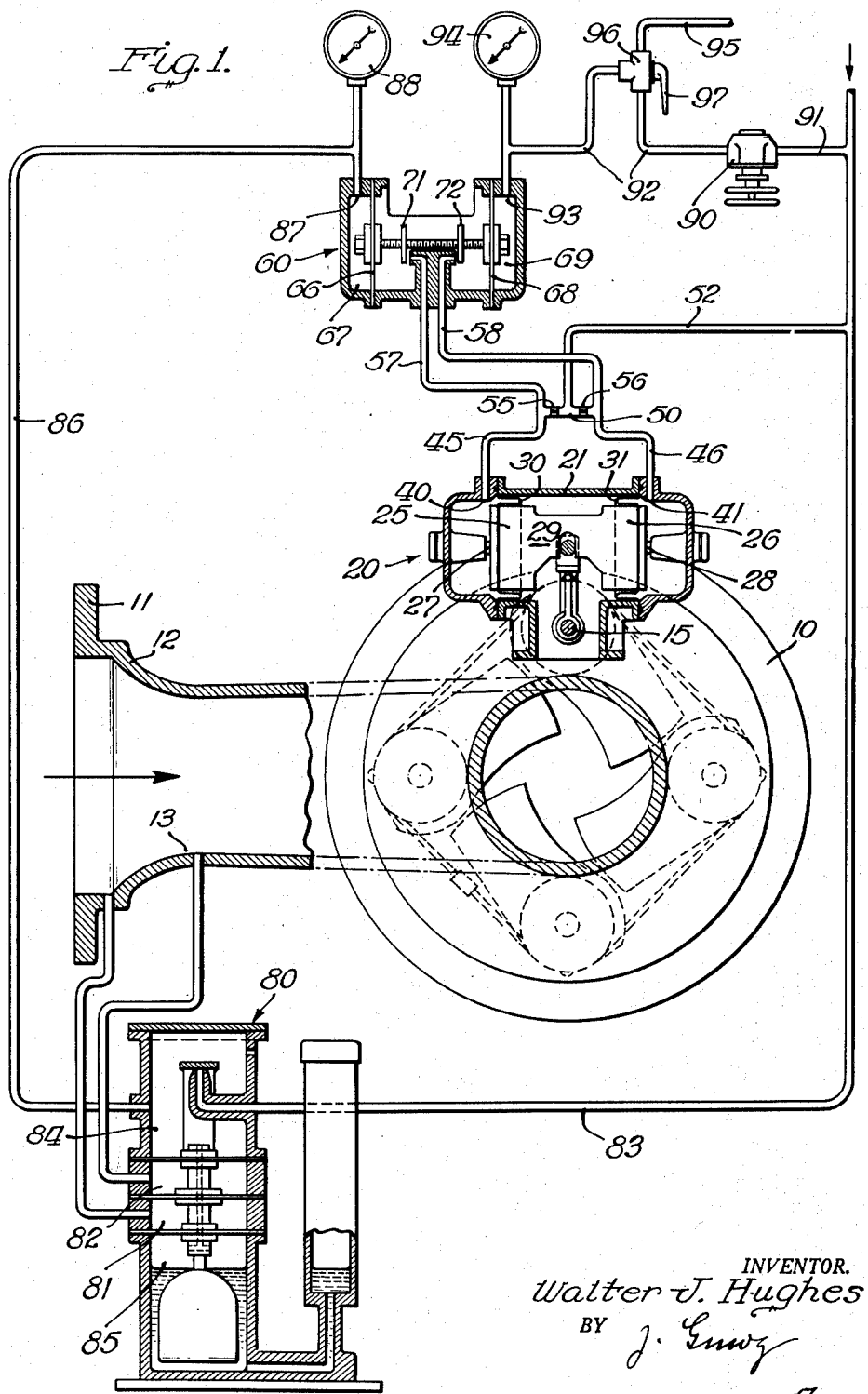
Figure 1 is a diagrammatic view, partly in section, of a system according to the invention.
Figure 4:
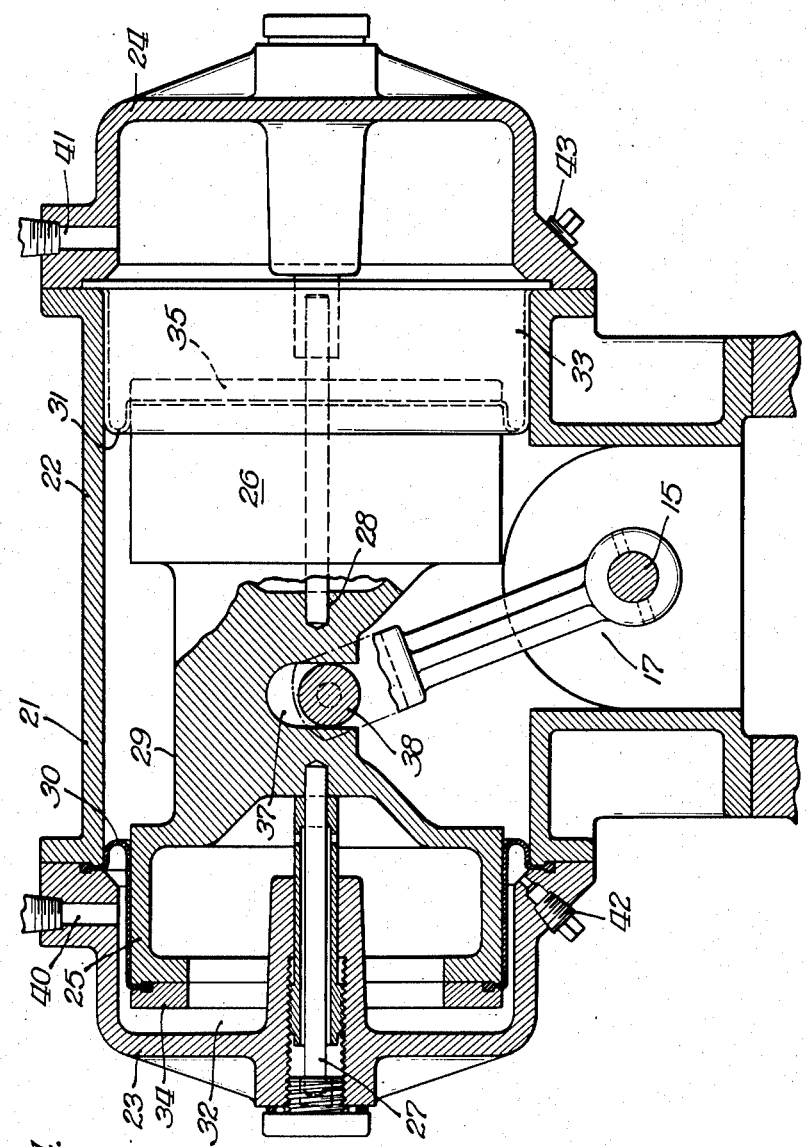
Figure 4 is a vertical view, partly in cross section, of the fluid motor connected to the drive shaft of the main control valve.

In Figure 1 a control valve 10 controls flow through a conduit 11, which has a Venturi tube 12 constructed thereinto. The valve 10 is of the balanced iris type shown and described in my Patent Number 2,307,273 and will, therefore, not be described in detail herein. Such a valve is preferably installed, as shown, closely behind the throat 13 of the Venturi tube 12. The drive shaft 15 of the valve 10 carries a crank 17 which is connected to and driven by a double-piston air motor, generally designated as 20. As best shown in Figure 4, the air motor 20 comprises a housing 21, including a central section 22 and two end sections, or caps, 23 and 24, which may be clamped to the opposed ends of the central section 22 by any suitable means, not shown. A pair of opposed pistons 25 and 26 are mounted in the housing 21. The pistons 25 and 26 have guide rods 27 and 28, slidingly supported with their outer ends in inwardly extending projections of the end sections 23 and 24, as shown. The pistons 25 and 26 are strutted and the strut 29 supports the inner ends of the guide rods 27 and 28.

Stocking type diaphragms 30 and 31 seal the gaps between the pistons and the housing 21, forming in the caps 23 and 24 of the housing, piston chambers 32 and 33, respectively. Diaphragm 30 is clamped with its outer edge between one end of the central section and the cap 23, and the outer edge of diaphragm 31 is clamped between the other end of the center section 22 and cap 24. The inner edges of the diaphragms are clamped to the opposed ends of the pistons 25 and 26, as by clamping rings 34 and 35, respectively. The diaphragms 30 and 31 permit substantially friction free movement of the pistons 25 and 26.

The strut 29 has a slot 37 in which rides a roller 38. The roller 38 is pinned to the fork end of the crank 17.

The piston chambers 32 and 33 are provided with air inlet ports, 40 and 41, respectively, formed in the caps 23 and 24 of the housing 20. Drains 42 and 43 permit draining any liquid entrained by the air entering the piston chambers and condensed therein.

Figure 3:
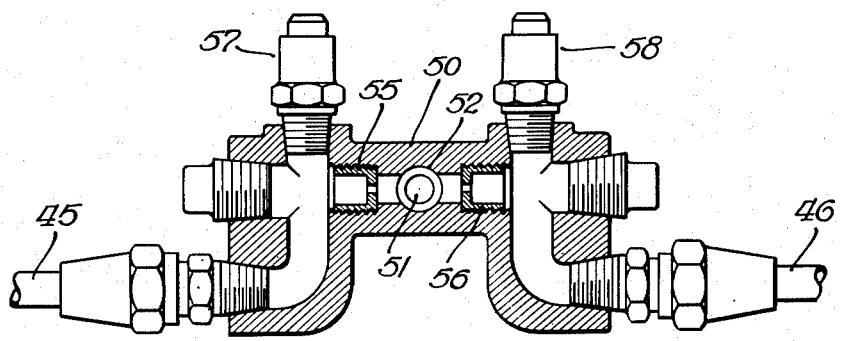
Figure 3 is a vertical cross sectional view of the pressure fluid supply connections of the system of Figure 1.

The air ports 40 and 41 of the piston chambers 32 and 33 are connected to a suitable source of air under pressure by means of air connections 45 and 46 leading from the ports 40 and 41, respectively, to an orifice supply fitting 50. As best shown in Figure 3, the supply fitting 50 has a main supply port 51 which receives air under pressure through conduit 52, and a pair of restricting orifice plugs, 55 and 56, through which air is conveyed from the main supply port 51 to the air connections 45 and 46, respectively, as shown. The air connections 45 and 46 connect also directly to the escapement connections 57 and 58 which lead to the escapement controller 60.

Figure 2:
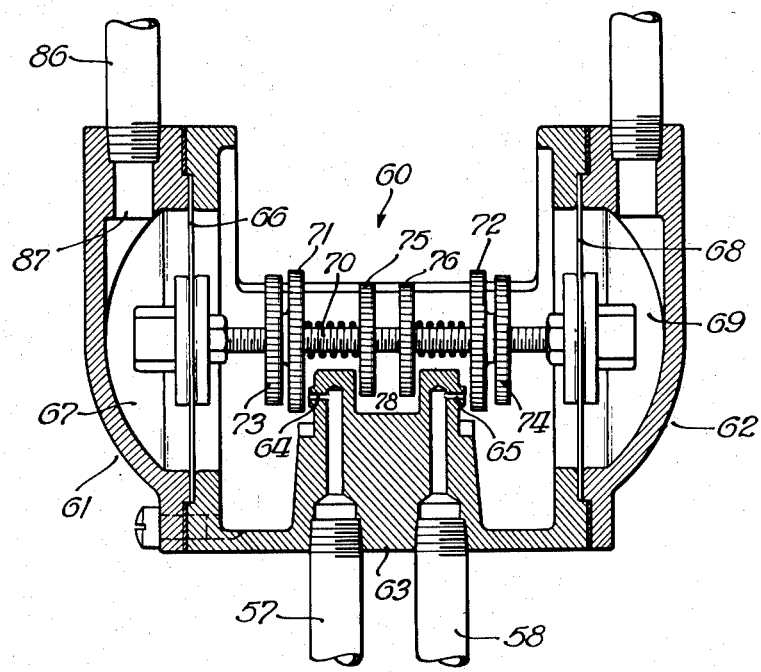
Figure 2 is a vertical cross sectional view of the escapement controller of the system of Figure 1.

The escapement controller 60, shown in detail in Figure 2, comprises an instrument base having dished opposite end sections 61 and 62 and a center section 63 which receives the end portions of the two escapement lines 57 and 58. Small escapement ports, 64 and 65, are formed in the center portion 63, one for each of the escapement lines 57 and 58, as shown. A diaphragm 66 is clamped between one end of the center section 63 and the end section 61 and forms with said end section a controlled air pressure chamber 67. A diaphragm 68, of the same effective area as the diaphragm 66, is clamped between the other end of the center section 63 and the end section 62 and forms with said end section a rating air pressure chamber 69. The diaphragms 66 and 68 are spaced from, and rigidly connected to, each other by a threaded thrust rod 70 which is secured to their center plates, as shown. The thrust rod 70 carries two valve discs, 71 and 72, which are adjustable along the rod 70 to provide with the ports 64 and 65 escapement valve openings of suitable size. Adjustable lock nuts 73 and 74, also carried by the rod 70, provide locks for the discs 71 and 72 in the desired positions. A pair of adjustable stop nuts 75 and 76 for limiting the length of the stroke of the diaphragm in either direction are mounted on the rod 70 in a slot 78 formed in the instrument base between the valve ports 64 and 65, and adjacent the sides of the slot.

The controlled air pressure applied to the chamber 67 is derived from a rate of flow converter 80. The converter 80 illustrated herein for exemplification is of the linear pneumatic type described in my Patent Number 2,520,547 and thus need not be described herein in detail. The high pressure chamber 81 of the converter 80 is connected to the inlet end of the Venturi tube 12 and the low pressure chamber 82 is connected to the throat 13 of the Venturi tube 12. The converter is connected to a suitable source of air under pressure by a line 83. The quantity of air admitted through the air inlet valve of the converter, and therefore the pressure in the air chamber 84 and the manometer chamber 85, depends on the pressure differential acting on the diaphragm system of the converter in valve opening direction. The differential is proportional to the flow rate through the conduit 11. The controlled air pressure thus obtained from the converter 80 is conveyed to the chamber 67 by a line 86 connected to an air inlet port 87 leading into the chamber 67. A pressure gage 88 may be connected to the line 86 to permit reading the pressure applied to the diaphragm 66.

The rating pressure for the chamber 69 is derived from a rate setting device which is connected to a suitable source of air under pressure. The rate setting device or pressure regulating valve 90 of Figure 1 may be manually set. The valve 90 is connected through a line 91 to a suitable source of air under pressure, as shown, and through a line 92 to an air inlet port 93 leading into the chamber 69. A pressure gage 94 is connected to the line 92 to permit reading the value of the set pressure applied to the diaphragm 68.

Instead of the manually set regulating valve 90 an automatically set control device can be used. Sometimes it is desirable to set a common rating pressure for a group of control systems from a master rate setter. In the preferred form of the invention shown in Figure 1, the rating pressure from a master rate setter, not shown, is conveyed through a line 95 to a three way air switch 96 on the line 92 leading from the regulating valve 90 to the chamber 69. By turning the handle 97 of the three way switch 96 to the proper positions, pressure manually set by valve 90 or the master rating pressure can be applied to chamber 69 as desired. This construction makes it possible to set a desired rate manually for an individual control system and, at will, to switch over to a common rating pressure from a master rate setter.

The operation of the control system will be readily understood. When the controlled air pressure derived from the flow through conduit 11 corresponds in value to the set or rating pressure, the pressures applied to diaphragm 66 and to diaphragm 68 are equal and the entire system is in balance. Figure 1 shows the system in balance, with valve discs 71 and 72 equally spaced from the escapement ports 64 and 65, permitting escape of equal quantities of air through line 57 and line 58. This provides for equal pressures on the pistons 25 and 26 so that no valve movement takes place. If the controlled air pressure which is responsive to flow through the conduit 11 decreases to a value below the rating pressure, the diaphragms 66 and 68 will be moved to the left (as shown in Figures 1 and 2). This unbalances the escapements, the disc 72 now restricting or closing the escapement port 65 and the disc 71 moving away from and opening the escapement port 64. The pressure on the valve opening piston 26 increases thereby and the pressure on the opposite piston 25 decreases, resulting in a movement of the control valve 10 toward open position, as shown in Figure 4. The resulting increase in flow increases the controlled air pressure responsive to flow as derived from the converter 80 until this pressure again balances the opposing rating pressure, whereupon the pressures on the two pistons balance and valve movement ceases, until a new unbalance of pressures occurs due to an increase or decrease of flow through the conduit 11. It will be obvious that an increase of flow to a value above the rating value results in a movement of the escapement valve discs to the right and an increase of pressure on the valve closing piston 25, whereby the valve is moved in closing direction until a balance of the valve operating pressures is restored by the equalizing of the flow controlled pressure and the rating or set pressure.

The air operated double escapement control and double piston valve motor provide a very sensitive and precise means for operating a control valve to maintain a predetermined rate of flow. This is due mainly to the fact that the correcting movement of the valve ceases as the correction is completed. The forces derived from the pistons of the valve motor, depending, as they do, upon the pressure in the piston chambers, come to a balance as soon as the correction is completed. Further, the neutral or balancing position of the two escapement valve discs 71 and 72 is always the same when correction is completed. Unbalance between the pressures applied to the diaphragms 66 and 68 is corrected by a minute movement without the objectional overtravel or hunting inherent in devices employing spring rated control valves with variably positioned escapements to compensate for variable spring forces at variable valve positions.

I claim:

1. A system for controlling flow through a conduit comprising a balanced iris type valve, a motor operatively connected to said valve, and means operating said motor to position said valve to maintain a predetermined rate of flow through said conduit, characterized in that said motor comprises a housing, opposed pistons slidingly supported in said housing with their outer ends, a strut joining the inner ends of said pistons, two diaphragms forming with the end portions of said housing two air chambers, said diaphragms sealing the gaps between said housing and said pistons and permitting substantially friction free travel of said pistons, and air inlets into said air chambers, and in that said motor operating means comprises an air line connected to each of said air inlets and adapted to be connected to a common source of air under pressure, a flow restricting member in each of said air lines, a line having an escapement to atmosphere, connected to each of said air lines intermediate its flow restricting orifice and its air inlet, a pair of opposed diaphragms of equal effective area, a rod rigidly connecting said diaphragms, valve discs carried by said rod and adjustably mounted on opposite sides of, and adjacent to, said escapements, and means for applying a rating air pressure to one of said diaphragms and an opposing air pressure responsive to the actual rate of flow through said control valve to the other of said diaphragms.

2. In a system for operating a flow control valve, a valve motor in driving connection with said valve, said motor including a pair of sealed piston chambers and a pair of opposed pistons slidingly supported in said piston chambers with their outer ends, a pair of pressure gas inlet lines connecting said piston chambers to a common source of gas under pressure, and control means regulating the gas pressure in said piston chambers, said control means comprising a flow restricting means in each of said gas inlet lines, a line having an escapement to atmosphere connected to each of said gas inlet lines, a valve for each of said escapements, a pressure differential responsive means including two diaphragms of equal effective area, rigid connecting means joining said diaphragms to each other, means for applying a rating gas pressure to one of said diaphragms, and means for applying a gas pressure varying as a function of the flow through the control valve to the other diaphragm, said valves being mounted on said connecting means in such manner that they are substantially equidistant from said escapements when the pressures on said diaphragms are balanced and that one of said valves is moved in valve closing direction and the other in valve opening direction upon unbalance of said pressures.

3. A system for operating a flow control valve to maintain a predetermined rate of flow comprising two air chambers, a pair of rigidly connected opposed pistons slidingly supported in said air chambers with their outer ends, two diaphragms sealing the gaps between said air chambers and said pistons and permitting substantially friction free travel of said pistons, air inlets into said air chambers, an air line connected to each of said air inlets and adapted to be connected to a common source of air under pressure, a flow restricting member in each of said air lines, a line having an escapement to atmosphere connected to each of said air lines intermediate its flow restricting orifice and its air inlet, a pair of rigidly connected valve discs mounted on opposite sides of, and adjacent to, said escapements, a pair of opposed rigidly connected diaphragms of equal effective area, and means for applying a rating air pressure to one of said diaphragms and an opposing air pressure responsive to the actual rate of flow through said control valve to the other of said diaphragms, said valve discs being connected with, and positioned by movement of, said diaphragms.

4. A direct acting pneumatic system for operating a flow control valve including a pair of piston chambers, a pair of opposed pistons connected to move in unison and slidingly supported with their outer ends in said chambers, said pistons being in driving connection with the valve to be operated, a pair of diaphragms sealing the gaps between said pistons and said chambers, a pair of air pressure lines connecting said piston chambers to a common source of air under pressure, a flow restriction in each of said air pressure lines, an escapement for each of said air pressure lines, a valve for each escapement, said valves being rigidly connected to each other and normally uniformly restricting the openings of their respective escapements, whereby the air pressures acting on said pistons are normally balanced, a pressure responsive device connected to said valves, means for applying a rating pressure to one side of said device, and means for applying a pressure responsive to flow through said valve to the other side of said device, said pressure responsive device being operative upon unbalance between said pressures to move one of said valves toward its escapement and the other valve away from its escapement, whereby the air pressures acting on said pistons are unbalanced in response to variations in flow through said control valve.

WALTER J. HUGHES.

REFERENCES CITED

The following references are of record in the file of this patent:

UNITED STATES PATENTS

| Number | Name | Date |
|---|---|---|
| 2,146,204 | Dore | Feb. 7, 1939 |
| 2,266,871 | Krough | Dec. 23, 1941 |

FOREIGN PATENTS

| Number | Country | Date |
|---|---|---|
| 387,038 | Great Britain | Feb. 2, 1933 |